United States Patent [19]
Lynch et al.

[11] 4,262,427
[45] Apr. 21, 1981

[54] FLUX VALVE COMPASS SYSTEM

[75] Inventors: Michael F. Lynch, Paterson, N.J.; Seymour Levine, Huntington, N.Y.

[73] Assignee: Sperry Corporation, New York, N.Y.

[21] Appl. No.: 65,655

[22] Filed: Aug. 10, 1979

[51] Int. Cl.³ ............................................. G01C 17/32
[52] U.S. Cl. ....................................... 33/361; 33/356; 324/260
[58] Field of Search .......................... 33/361, 362, 356; 324/244, 253, 258, 260

[56] References Cited
U.S. PATENT DOCUMENTS
3,601,899 8/1971 Artz ........................................ 33/361

FOREIGN PATENT DOCUMENTS
495528 12/1975 U.S.S.R. ................................... 33/361

Primary Examiner—William D. Martin, Jr.
Attorney, Agent, or Firm—Howard P. Terry

[57] ABSTRACT

An improved earth's magnetic field sensing compass utilizes a flat, toroidal flux valve in which pickoffs sense mutually perpendicular components of the magnetic field and the fields are nulled by the closed loop feed back of nulling currents into respective pairs of the sensor pickoffs.

14 Claims, 3 Drawing Figures

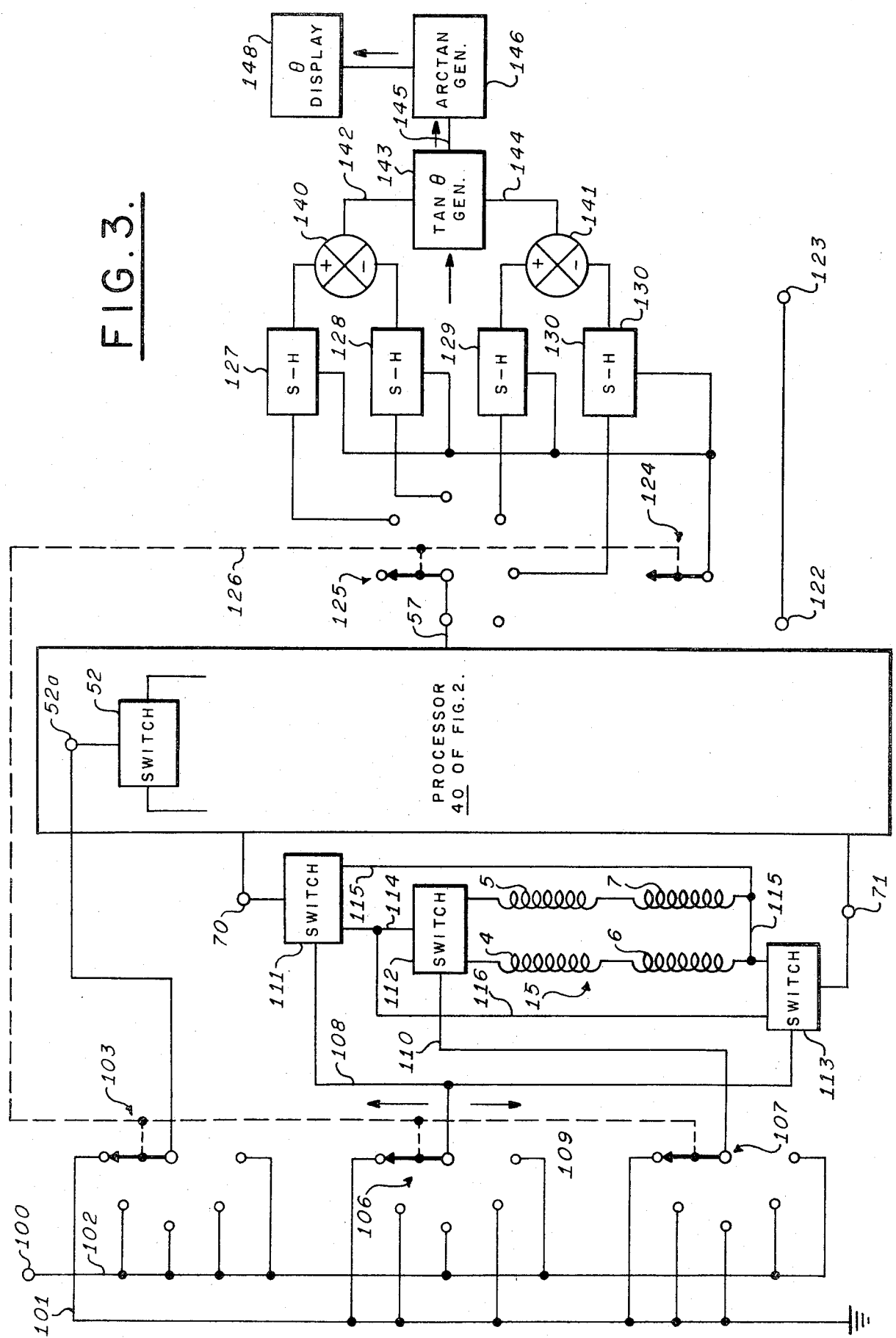

FLUX VALVE COMPASS SYSTEM

BACKGROUND OF THE INVENTION

1. Field of the Invention

The present invention pertains to improvements in magnetic field sensing compasses utilizing magnetic azimuth or flux valve pickoffs in which sensed mutually perpendicular components of the earth's field are nulled by the closed loop feed back of nulling currents into respective pairs of flux valve sensing windings.

2. Description of the Prior Art

A known flux valve earth's field directional pickoff is a structure having a cooperating equiangular Y-shaped laminated core, an excitation winding, and sensing windings surrounding and coupled to each of the three legs of the core and disclosed widely in the literature, as in the O. E. Esval, C. F. Fragola, and L. F. Beach U.S. Pat. No. 2,383,461 for a "Flux Valve Compass System," issued Aug. 28, 1945, and in the M. C. Depp U.S. Pat. No. 2,852,859 for "Flux Valve Compensating System," issued Sept. 23, 1958, both parents being assigned to Sperry Rand Corporation. Such flux valves are normally mounted with the plane of the core disposed horizontally so that they measure the earth's total horizontal magnetic field, if properly compensated for any error effects produced by spurious magnetic fields associated with the structure of the craft on which the flux valve is mounted. Such flux valves are directly suited to use in open loop three-wire selsyn data transmission systems either for slaving a directional gyroscope, or for providing a direct analog representation or indication of the angle of a craft longitudinal axis relative to magnetic north at a receiving device. However, such open-loop systems suffer various disadvantages. For example, the output of the Y-shaped flux valve is rich in harmonics and accurate demodulation is difficult, especially for low signal levels. Craft vibrations also produce spurious flux valve outputs. Conversion of the alternating currents from the flux valve into unidirectional sine and cosine signals of sufficient accuracy as often required in navigation equipment is difficult.

Closed loop compass systems were then realized to overcome some of the foregoing difficulties of the prior art, such as the compass systems of the D. H. Baker, F. H. Kallio U.S. Pat. No. 3,678,593 for a "Compass System and Components Thereof Having Automatic Field Compensation," issued July 25, 1972, and of the J. R. Erspamer U.S. Pat. No. 3,942,257 for "Index Error Correction for Flux Valve Heading Repeater System," issued Mar. 9, 1976, both patents being assigned to Sperry Rand Corporation. In these systems, the output of a three-legged flux valve is converted into direct current signals representative of the components of the sensed earth's field vector. These currents provide the useful compass output signals and are also fed back into the legs of the flux valve in a direction which substantially nulls the earth's field vector. Thus, the compass operates about a null condition in a closed loop manner affording improved directional accuracy particularly as discussed in the aforementioned Baker et al patent.

SUMMARY OF THE INVENTION

The present invention also provides the benefits of servo operation with improved linearity about an error nulled condition and provides an inexpensive, compact compass system cooperating with a miniature flux valve having flat toroidal form. The flux valve employed is equipped with two cooperating pairs of pickoff coils so that the earth's magnetic field is readily resolved into components parallel and perpendicular to the flux valve directional reference axis, the two sets of pickoff coils being mounted orthogonally and diametrically on the toroidal flux valve core. The coil configuration permits automatic cancellation of bias effects which, if present, would cause undesired one and two cycle error generation. Both the parallel and perpendicular components of the earth's field are generated in the same flux valve and undergo time shared manipulation in the same compass channel, so that dual channel gain errors are eliminated. Furthermore, both the parallel and perpendicular components of the earth's magnetic field are found without physically moving or rotating the flux valve, enabling size, cost, and power drain to be reduced while increasing reliability.

BRIEF DESCRIPTION OF THE DRAWINGS

FIG. 3 is a wiring diagram illustrating a novel application of the invention in a time sharing system for measuring orthogonal components of the earth's magnetic field and for calculating precise magnetic heading data, certain errors being inherently eliminated in the computing process.

DESCRIPTION OF THE PREFERRED EMBODIMENTS

Figure 1:
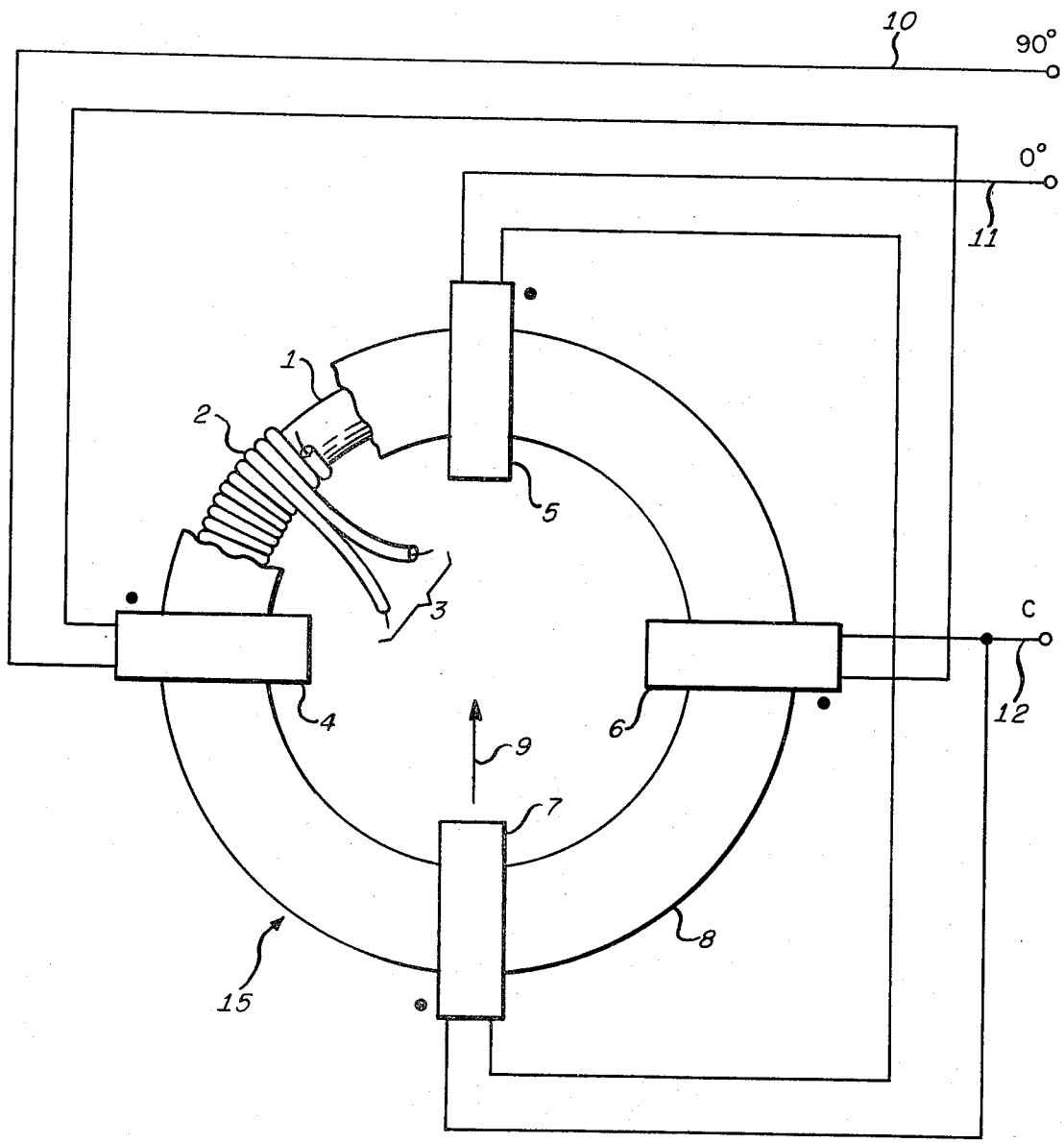
FIG. 1 is a plan view in partial cross section of the flux valve dual-component sensor of the present invention.

The miniature flux valve employed in the novel compass system, unlike the Y-shaped core flux valve, employs the annular structure of FIG. 1. The core 1 of the valve 15 consists of a single thin apertured disk fabricated of a high permeability, low hysteresis iron-nickel alloy such as the alloy available from Magnetics, Inc. of Butler, Pennsylvania under the trade name Supermalloy. In one embodiment of the invention, core 1 has an outer diameter of about 2.9 inches and an inner diameter of about 2.7 inches, being about 4 mils thick. An inner excitation winding 2 having, for example, 700 turns and terminals 3, is wound continuously around core 1; a protective or insulating tape or other material may be used as at 8 to cover the multi-turn excitation coil 2. Core 1 is preferably energized by applying an alternating current through coil 2 so that core 1 is magnetically saturated twice per cycle. With respect to the reference direction indicated by arrow 9, a pair of cooperating equal rectangular pickoff coils 5, 7 is disposed in mutual diametral relation at right angles to core 1 and in the plane of arrow 9. A second pair of cooperating pickoff coils 4, 6 lies perpendicular to core 1 and to reference direction 9. Coils 4, 6, like coils 5, 7 are similar, all having the same number of turns (100, for example). Accordingly, the voltages induced in coils 4 and 6 by a periodically varying exciting flux generated by excitation winding 2 are equal in magnitude in the absence of any earth's or other magnetic field. Coils 4 and 6 are connected as shown in FIG. 1 in series opposition, so that the resultant voltage between the common lead 12 and the 90° output lead 10 is zero in the absence of any externally applied magnetic field, such as the earth's field. In a generally similar manner, coils 5 and 7 are also connected in series opposition, so that the resultant voltage between the common lead 12 and the 0° output lead 11 is also zero in the absence of an externally applied magnetic field.

If a unidirectional magnetic field having a component in the direction of reference direction 9 is present, differential voltages induced in coils 4, 6 will have a frequency twice that of the exciting flux and a phase corresponding to the sense of the applied field along the direction of arrow 9. In other words, series connected coils 4, 6 produce a voltage at terminals 10, 12 varying sinusoidally in amplitude as a function of the angle between the direction of the applied unidirectional magnetic field and the orientation of the plane of coils 4, 6. The output on leads 11, 12 of the cooperating coils 5, 7 is similar, but shifted by 90° with respect to the 0° output of coils 5, 7. Flux valves of the general type shown in FIG. 1 are well known in the art as advantageous because they do not accidentally become magnetized and are very thin; they are described generally in the U.S. Pat. No. 2,389,146 to C. F. Frogola, M. C. Depp, and R. S. Curry, issued Nov. 20, 1945 for a "Flux Valve" and assigned to Sperry Rand Corporation.

The excitation field produced by winding 2 drives core 1 well into positive and then into negative saturation once each cycle of its excitation current. When the unidirectional earth's field is present, that field adds to the alternating excitation, causing core 1 to go into saturation sooner or later according to the polarity of the earth's field than it would go into saturation in the absence of the earth's field. In effect, this operation time-shifts the voltages found in the pairs of pickoff coils so that they no longer cancel when the earth's field is present, ultimately to produce a resultant unidirectional voltage directly proportional to the earth's field.

Figure 2:
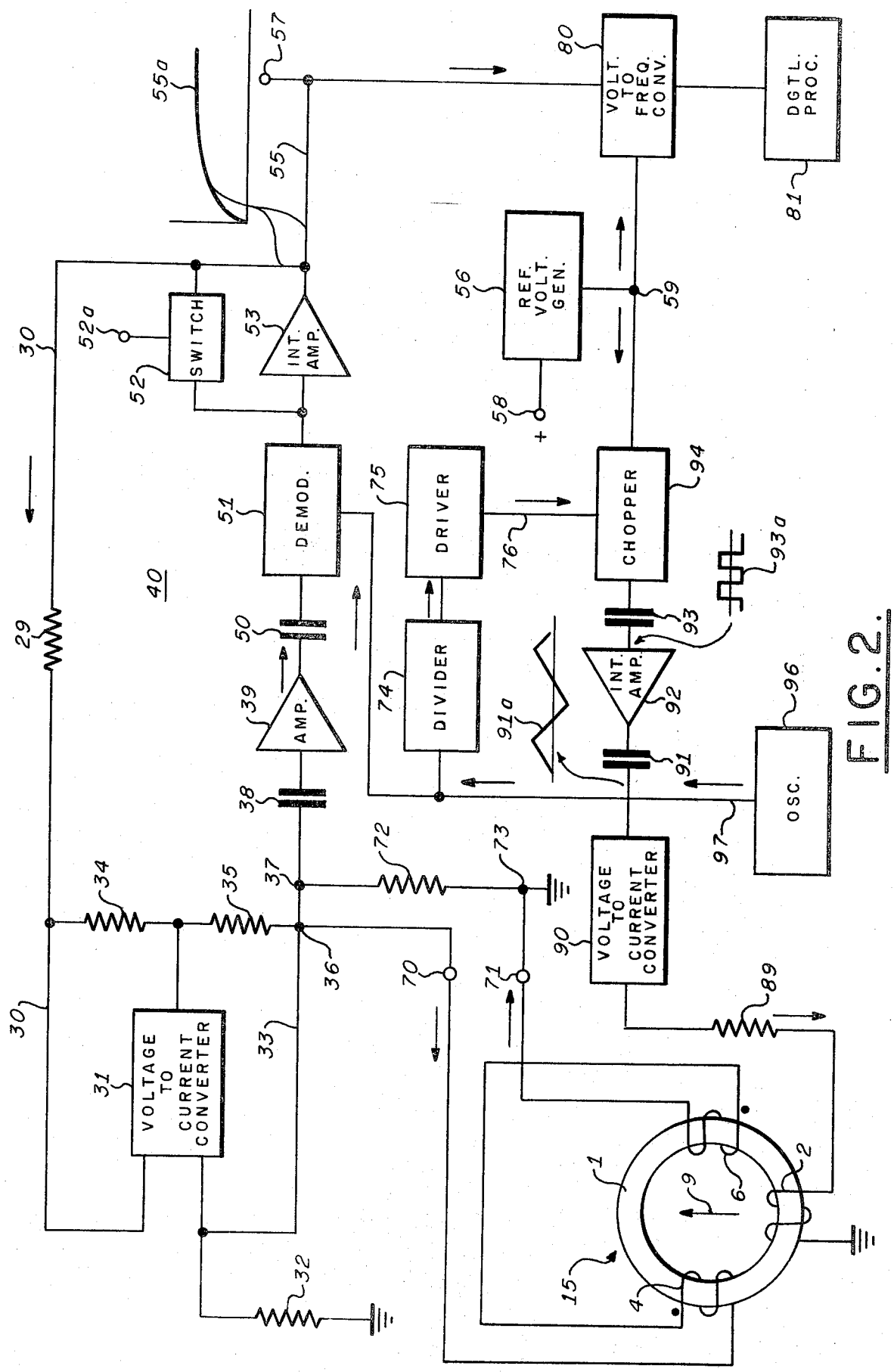
FIG. 2 is a wiring diagram illustrating the novel compass processor system cooperating with one of the two pairs of sensor coils of the flux valve of FIG. 1 and showing electrical components and their interconnections.

For producing the desired conversion, the apparatus of FIG. 2 is employed. Use of the invention is shown here with a flux valve 15 having two diametrically cooperating opposed pickoff coils 4, 6. The companion coils 5, 7 may be similarly operated on a time sharing basis with respect to junctions 70, 71, as will be further discussed in connection with FIG. 3.

Returning to FIG. 2, stable oscillator 96 acts as a synchronizer for the system operating, for example at 4 KHz and providing signals via branching lead 97 to divider 74 and to demodulator 51. Considering first the current path including frequency divider 74, it feeds a signal at, say 2 KHz, to the input of a conventional driver amplifier 75, whose output is fed through lead 76 to a conventional chopper circuit 94. The direct current level fed from junction 59 is by virtue of a source (not shown) coupled to terminal 58 and reference voltage generator 56, substantially a constant level signal and is used to stabilize the amplitude of the output of chopper 94, this level being chopped at the frequency of the output 76 of driver 75. Blocking capacitor 93 interposed between chopper 94 and integrating amplifier 92 supplies the latter with the bipolar pulse train 93a. The effect of integrating amplifier 92 and coupling capacitor 91 is to produce the regular bipolar triangular wave 91a. The latter is supplied through a conventional voltage-to-current converter 90 and resistor 89 to the excitation winding 2 of flux valve 15, retaining its bipolar triangular wave form at the converter output.

For providing a useful compass output, as at terminal 57, and for feed back cancellation of the earth's field within flux valve 15, the apparatus in the upper portion of FIG. 2 is employed. For this purpose, the double frequency voltage present across cooperating coils 4, 6 when the earth's field is present is coupled through junctions 70, 71 and junctions 36, 37, 73 across the input resistor 72, whence it is coupled by blocking capacitor 38 to the input of a.c. amplifier 39. The output of amplifier 39 is coupled by blocking capacitor 50 to demodulator 51. This input to circuit 51 is in the form of a frequency doubled (4 KHz) error signal, so that the synchronizing oscillator 96 output is directly coupled by lead 97 to enable performance of the demodulation function of circuit 51. The demodulated direct current error signal is now coupled to integrating amplifier 53, which rapidly produces an asymptotic constant voltage level 55a representative of the angle between north and the flux valve index 9 on leads 30 and 55 and at output terminal 57.

The integrated signal 55a, in the instance illustrated, is the cosine of the earth's field direction and may be supplied via lead 30 and resistor 29 to one input of a voltage-to-current converter 31; the second input of converter 31 is coupled through resistor 32 to ground and to junctions 36 and 70. A power divider resistance network 34, 35 couples the output of converter 31 through resistor 34 and lead 30 to the first input of converter 31 and also couples the output of converter 31 through resistor 35 to junction 36. Terminal 36 is also coupled via lead 33 through resistor 32 to ground. In this general manner, the integral of the direct current error signal at the output of integrating amplifier 53 is fed back through cooperating pickoff coils 4, 6 in such a way as to cancel substantially the effect of the earth's field flux within flux valve 15. The output of integrating amplifier 53 may furthermore be connected as a useful direction-indicating signal to a conventional voltage-to-frequency converter 80, also employing the reference voltage at junction 59 from generator 56 for scale stabilizing purposes. The output of converter 80 may then be used for navigation or flight control purposes, as in a conventional digital processing system 81. It will be readily understood that before the circuit is first placed into operation, integrating amplifier 53 will be placed in its initial state by rendering switch 52 conductive, as by applying an appropriate activating potential to the switch control terminal 52a or by grounding the appropriate one of the terminals of amplifier 53 according to conventional practice.

The apparatus of FIG. 2 may be used advantageously with all four pickoffs, 4, 6, and 5, 7 of FIG. 1 as in FIG. 3, wherein those four pickoff coils are illustrated, though the flux valve excitation coil 2 and core 1 are not shown merely as a matter of convenience in maintaining simplicity in the drawings. The purpose of FIG. 3 is also to illustrate an advantage of the invention whereby it may be employed in novel navigation instrumentalities in the past requiring physical movement of the flux valve so as to cancel certain bias effects. In such apparatus, certain measurements and computations are made serially in time. For example, prior art systems make one magnetic field reading and then physically rotate the valve through 90° in azimuth before making a second reading. In the present invention, non-mechanical reversal of coil terminals ultimately permits cancellation of electronic biases with power usage economy, and both parallel and perpendicular components of the earth's field are quickly found with no rotation of the flux valve.

As seen in FIG. 3, the apparatus utilizes an array of switches shown, merely by way of illustration, as manually rotatable mechanical switches 103, 106, 107, 125 all operated in synchronized relation by mechanical or other linkage 126. It will be obvious to those skilled in the art that electronic switches such as semiconductor switches may be substituted, and that they may be manually operated or automatically positioned according to a predetermined time schedule. The rotary switch 103 determines the condition of the initial-state setting switch 52 of processor 40 in FIG. 2, closing the switch 52 when the rotary blade of the switch 103 is vertically upward in the drawing. For all other positions of the blade of switch 103, a positive voltage from a source (not shown) coupled at terminal 100 is coupled by bus 102 to render switch 52 non-conducting.

The rotary switches 106 and 107 determine the states of two-way switches 111, 112, and 113 in a coordinated manner. The first (vertically up) second, and fourth positions of rotary switch 106 couple the ground potential via bus 101 and leads 108 and 109 to switches 111 and 113, while the third and fifth positions of rotary switch 106 couple a positive potential from the positive bus 102 to switches 111, 113, causing them to change state. Rotary switch 107 cooperates only with two-way switch 112 via lead 110. The switch input lead 110 is grounded for the first (vertically up), second, and third positions of rotary switch 107 and supplies a positive bias for the last two positions of switch 107.

Switch 111 has an input coupled to junction 70 of processor 40. Switch 111 has two selectable outputs 114 and 115. Output 114 is the input to switch 112 and its branching lead 116 is one input to dual-input switch 113. Switch 112 has two possible outputs; one is the series connected pair of pick up coils 4, 6, while the other is the series connected pair of pick up coils 5, 7. Opposite dual position switch 112, the coil pairs are both coupled to lead 115 from switch 111 and to the second input of dual-input switch 113. The single output of dual input switch 113 is coupled to junction 71 of the processor 40 of FIG. 2.

The sets of switches just described permit the selection of pairs of pick up coils and their effective reversal as coupled at junctions 70, 71 of processor 40 in five successive cyclic steps. In the first step, inputs to switches 52, 111, 112, 113 are all at ground. This is a standby mode in which the significant event is that the flux valve error integrating amplifier 53 is held in its truly zeroed initial state.

In step 2, only the 0° set of series connected pickoff coils 4, 6 is connected to junctions 70, 71 through switch 111, lead 114, switch 112, coils 4, 6, lead 115, and switch 113. This state comes about when rotary switches 103, 106, 107 and 125 are moved one step from the first vertically upward position and each remains on its second contactor terminal. After a short time interval, such as about one second, and when the feed back loop through resistor 29 and converter 31 has settled, a sample of the flux valve output is available at the output junction 57 of processor 40.

The foregoing sample will now be passed to a conventional sample and hold circuit 127, rotary switch 125 having moved one step to permit its flow. There are four such sample and hold circuits 127, 128, 129, 130, each coupled to one of the last four terminals of rotary switch 125. The outputs of sample and hold circuits 127, 128 are coupled, in the polarity shown, to opposed inputs of a summation device 140 whose output is coupled via lead 142 to one input of tangent function generator 143. Similarly, the outputs of sample and hold circuits 129, 130 are connected, in the polarity shown, to opposed inputs of a second summation device 141 whose output is coupled by lead 144 to a second input of tangent function generator 143. The output of generator 143 is coupled via lead 145 to a conventional arctangent generator 146, whereby an angle, such as the true heading angle $\theta$, may be indicated on a conventional numerical display device 148. It will be apparent that the outputs of sample and hold circuits 127, 128, 129, 130 may be transferred simultaneously when all are present to the respective summation circuits 140, 141 by well known means, such as by the generation of a transfer signal when the ganged switch 124 is turned to the location of contact 122 coupled to a suitable power source (not shown) at terminal 123.

It will be understood that the data held in sample and hold device 127 is representative of a quantity:

$$y_1 = A \sin \theta + B \tag{1}$$

where $\theta$ is the desired value of the angle between magnetic north and the flux valve reference direction 9, A is a scale factor dependent upon electronic gain in the system, and B is an undesired bias term depending upon circuit anomolies.

In step 3, the rotary switches 103, 106, 107, 125 are each rotated to their horizontal locations. While the control input signal applied to switch 112 remains as before, the inputs via leads 108, 109 to switches 111 and 113 are changed so that flow of current through the series coils 4, 6 is reversed. Thus, the 0° set of pickoff coils is electrically reversed in polarity with respect to their coupling to terminals 70, 71 of processor 40. After the same short interval (one second) when the feed back loop 29, 31 has settled, the new output at junction 57 is placed in the second sample and hold device 128. This new quantity may be represented as:

$$y_2 = -A \sin \theta + B \tag{2}$$

wherein the symbols are generally the same as those of Equation (1). The two quantities $y_1$ and $y_2$ may then be applied for algebraic subtraction in device 140, generating:

$$y_3 = 2A \sin \theta \tag{3}$$

independent of the anomoly B which would create an undesirable one cycle error, if present.

In step 4, only the 90° set of series connected coils 5, 7 is connected through switch 111, lead 114, switch 112, coils 5, 7, lead 115, and switch 113. This state is brought about when rotary switches 103, 106, 107, and 125 are moved from the third to the fourth or next-to-last switch position. After settling of the feed back loop, a third sample of the flux valve output is present at the output junction 57 of processor 40. The sample may now be passed to the third sample and hold circuit 129, rotary switch 125 having been moved to its fourth position. The data then held in sample and hold device 129 is representative of:

$$y_4 = A \cos \theta + B \tag{4}$$

In step 5, the rotary switches 103, 106, 107, 125 are all moved to their last or fifth position, their blades all pointing downward. The input to dual output switch 112 remains positive, while the inputs to switches via leads 108, 109 are now also positive so that the flow of current through the series coils 5, 7 is reversed. Accordingly, the 90° set of pickoff coils 5, 7 is electrically reversed in polarity with respect to their coupling to terminals 70, 71 of processor 40. After the proper settling interval, the new output at junction 57 is placed in the fourth sample and hold device 130. This new quantity may be represented as:

$$y_5 = -A \cos \theta + B \tag{5}$$

After subtraction of the quantities represented by Equation (4) and Equation (5) in algebraic summation device 141, the quantity B is eliminated and there is yielded on lead 144 the quantity:

$$y_6 = 2A \cos \theta \tag{6}$$

Tangent generator 143 is a conventional divider type of device, so that division therein of the quantities $y_3$ by $y_6$ can readily be accomplished, generating:

$$y_7 = \tan \theta \tag{7}$$

The value of $\theta$ in Equation (7) is readily found by the conventional arctangent generator 146, so that the value $\theta$ may readily be determined as previously discussed.

It is now evident by inspection of Equations (1) through (7) that their solutions may be accomplished by any of several kinds of instrumentation, including the use of a cooperative assembly of known analog or of digital data processing or computing circuits. For example, the several equations involve simple arithmetic operations such as addition, subtraction, multiplication, division, and trigonometric function generation. Many examples of both analog and digital computation elements are available in the prior art for accomplishing such computer operations; hybrid computer solutions may be used. It is furthermore evident that a conventional general purpose digital or analog computer may be employed for the purpose. It is obviously well within the ordinary skill of digital computer programmers to process the equations discussed above, to create flow charts, and to translate the latter into computer routines and sub-routines for solution of such equations along with a compatible computer language for processing input data and instructions to produce outputs directly useful for application, for example, in a standard display.

Accordingly, it is seen that the invention provides a versatile, low power, compact, light weight flux valve compass system employing a toroidal flux valve with two cooperating pairs of pickoffs disposed so that resolved orthogonal components of the earth's magnetic field are readily derived. Automatic cancellation of one and two cycle errors is provided. Dual channel errors are eliminated by time sharing of a common compass channel. No physical motion of the flux valve sensor is required reliably to provide precise compass output data. Servoed cancellation of the earth's field vector provides improved linearity of operation.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An improved magnetic compass of the type having magnetic field detector means comprising toroidal core means having excitation coil means and at least a first diametrically opposed pickoff coil means connected in series opposition and forming a first impedance element, wherein the improvement comprises:
    triangular wave generator means coupled to said excitation coil means for driving said core means into saturation twice per cycle of said triangular wave,
    demodulator means responsive to the unbalance output of said first impedance element in the presence of a first predetermined component of the earth's field for the time shared manipulation of the output of said pickoff coil means in the same channel,
    first integrator means responsive to said demodulator means for generating an integrated output,
    network means responsive to said integrator means for coupling said integrated output back to said first impedance element for cancelling said predetermined component of the earth's magnetic field, and
    additional utilization means directly responsive to said integrated output.

2. Apparatus as described in claim 1 wherein said triangular wave generator means comprises:
    stable reference voltage generator means,
    circuit means for chopping said stable reference voltage, and
    second integrator means responsive to said circuit means for producing said triangular wave.

3. Apparatus as described in claim 2 further including voltage to current converter means responsive to said second integrator means for exciting said excitation coil means.

4. Apparatus as described in claim 2 further including:
    oscillator means, and
    frequency divider means responsive to said oscillator means,
        said frequency divider means controlling the operation rate of said circuit means,
        said demodulator means being additionally responsive to said divider means.

5. Apparatus as described in claim 1 wherein said network means includes voltage to current converter means.

6. Apparatus as described in claim 1 wherein said network means includes:
    voltage to current converter means having output means and having input means coupled through first resistor means to receive said integrated output,
    voltage divider means including second resistor means coupled between said first resistor means and said input means to said output means,
        said voltage divider means additionally including third resistor means coupling said output means in series to said pair of pickoff coil means.

7. Apparatus as described in claim 1 wherein said magnetic field detector means includes a second pair of diametrically opposed pickoff coil means connected in series opposition, disposed on said toroidal core means at right angles to said first pair of diametrically opposed pickoff coil means, and forming a second impedance element.

8. Apparatus as described in claim 7 further including switching matrix means for selectively coupling said first impedance element in first or second respective states directly or in reversed connection to said demodulator means whereby, in said first stage, said integrated output is:

$$y_1 = A \sin \theta + B$$

and, in said second state, said integrated output is:

$$y_2 = -A \sin \theta + B$$

where:
$\theta$ is the desired value of the angle between magnetic north and the flux valve reference direction,
A is a scale factor, and
B is an undesired circuit bias term.

9. Apparatus as described in claim 8 wherein said switching matrix means is further adapted for selectively coupling said second impedance element in third or fourth respective states directly or in reversed connection to said demodulator means whereby, in said third state, said integrated output is:

$$y_4 = A \cos \theta + B$$

and, in said fourth state, said integrated output is:

$$y_5 = -A \cos \theta + B.$$

10. Apparatus as described in claim 9 further including: first, second, third, and fourth sample and hold means, said switching matrix means being further adapted selectively and successively to couple said respective first, second, third, and fourth state integrated outputs for holding in said respective sample and hold means.

11. Apparatus as described in claim 10 further including first summation means responsive to said first and second sample and hold means outputs, when present, for forming the algebraic summation thereof as defined by:

$$y_3 = 2A \sin \theta.$$

12. Apparatus as described in claim 11 further including second summation means responsive to said third and fourth sample and hold outputs, when present, for forming the algebraic summation thereof as defined by:

$$y_6 = 2A \cos \theta.$$

13. Apparatus as described in claim 12 further including divider means responsive to said first and second summation means for forming the value:

$$y_7 = \tan \theta$$

whereby $y_7$ is rendered independent of the quantities A and B.

14. Apparatus as described in claim 13 further including arctan generator means for computing $\theta$ from $\tan \theta$.

* * * * *